United States Patent Office 3,707,496
Patented Dec. 26, 1972

3,707,496
ORGANIC ISOCYANATE PREPARATION
Arthur J. Coury, Minneapolis, Minn., assignor to
General Mills Chemicals, Inc.
No Drawing. Filed Oct. 5, 1970, Ser. No. 78,198
Int. Cl. C07c 119/04
U.S. Cl. 260—453 P
8 Claims

ABSTRACT OF THE DISCLOSURE

Organic isocyanates are prepared in one step from acyl halides and metal azides using N-methyl-2-pyrrolidone as part of the reaction medium.

---

The present invention relates to a new process for preparing organic isocyanates. More particularly, it relates to such a process employing N-methyl-2-pyrrolidone.

I have now discovered that the inclusion of N-methyl-2-pyrrolidone as part of the reaction medium for the reaction of an acyl halide and a metal azide to form an organic isocyanate in one step provides certain processing advantages. Thus the acyl azide is decomposed as formed thereby minimizing the dangers of vigorous decomposition. Additionally, reaction rates are comparable to those high-temperature processes heretofore reported in the literature. Organic isocyanates with good colors and excellent purity result from my process.

Any of a wide variety of organic acyl halides can be used as the starting materials in the process of the present invention. Such acyl halides may be mono, di, tri or higher in functionality although the dihalides are preferred since they yield diisocyanates which are highly useful commercially for the preparation of polyurethanes, polyureas and the like through reaction with active hydrogen containing organic compounds. Of the acyl halides the acyl chlorides are preferred due primarily to their more ready availability and/or preparation. The following are representative of various organic acyl halides which find use in our process: aliphatic acyl halides—octanoyl chloride, decanoyl chloride, 10-undecanoyl chloride, dodecanoyl chloride, palmitoyl chloride, oleoyl chloride, stearoyl chloride, cyclohexane acid chloride, suberoyl chloride, sebacoyl chloride, n-decane-1,10-dicarboxylic acid dichloride, n-hexadecane-1,16-dicarboxylic acid dichloride, and the like; aromatic acyl halides—benzoyl chloride, terephthaloyl chloride, isophthaloyl chloride, 1,5-naphthalene diacid chloride, and the like; and complex materials such as the diacid chloride of 1,1,3-trimethyl-5-carboxy-3(carboxyphenyl)indan, the chlorides of polymeric fat acids and the like.

The halides of polymeric fat acids represent one preferred group of starting materials. The halogenation or chlorination of the acids can be carried out by conventional procedures using $PCl_3$ and the like. Polymeric fat acids are well known and commercially available. One method of preparation of polymeric fat acids can be seen in U.S. Pat. 3,157,681. The polymeric fat acids useful in preparing the starting acyl halides are produced by polymerizing ethylenically unsaturated monobasic carboxylic acids having 16 to 22 carbon atoms or the lower alkyl esters thereof. The preferred aliphatic acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-otadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12 - octadecadienoic, 12,15 - octadecadienoic and the like. Representative octadecatrienoic acids are 9,12,15-octadecatrienoic (linolenic), 6,9,12- octadecatrienoic, 9,11,13-octadecatrienoic (eleostearic), 10,12,14-octadecatrienoic (pseudo eleostearic) and the like. A representative 18 carbon atom acid having more than three double bonds is moroctic acid which is indicated to be 4,8,12,15-octadecatetraenoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the polymerization of the unsaturated acids. Lower temperatures are generally used when a catalyst is employed.

It is also preferred that the polymeric fat acids used in the preparation of the halides are hydrogenated in order to improve the color thereof. The hydrogenation is accomplished using hydrogen under pressure in the presence of a hydrogenation catalyst. The catalysts generally employed in such hydrogenations are Ni, Co, Pt, Pd, Rh and others of the platinum family. In general, the catalyst is suspended on an inert carrier such as kieselguhr, commonly used with Ni, and carbon, commonly used with the platinum family of catalyst.

The N-methyl-2-pyrrolidone is used in an amount sufficient to accelerate the reaction. Preferably, however, the N-methyl-2-pyrrolidone is used in amounts of about .25 to 25% by weight based on the weight of the acyl halide.

The N-methyl-2-pyrrolidone is preferably used in combination with an inert, essentially water-immiscible organic solvent which is preferably a hydrocarbon or chlorinated hydrocarbon such as heptane, cyclohexane, toluene, benzene, 1,2-dichloroethane, chlorobenzene and the like. The amount of the solvent used is not critical but is preferably from about ½ to 2 times the weight of the acyl halide.

The metal azides which may be employed in the production of the organic isocyanates in accordance with my invention are preferably the alkali metal and alkaline earth metal azides such as potassium azide, sodium azide and the like. It is especially preferred to use sodium azide. The metal azide will be used in an amount at least equivalent to the equivalents of acyl halide. And it is especially preferred to use an excess of the metal azide, such as from more than 1 to 3 times the equivalents of acyl halide. A large excess considerably accelerates the reaction.

The reaction is preferably carried out under reflux conditions with mixing of the reactants, such as by stirring or other agitation. Reaction temperatures sufficiently high to decompose the forming acyl azide are used. Preferably, the process will be carried out at temperatures of from about 70 to 150° C.

The following examples serve to illustrate certain preferred embodiments of the invention without being limiting.

EXAMPLE I

Dimer acid chloride (15.3 g., 0.05 eq.) was dropped into a stirring mixture of 1 ml. N-methyl-2-pyrrolidone, 25 ml. n-heptane and 3.58 g. (0.055 eq.) sodium azide which had been heated to reflux. The dimer acid chloride had the formula ClOC—D—COCl where D is the 34 carbon atom divalent hydrocarbon radical of the dimerized fat acid obtained by polymerizing, distilling and hydrogenating (in the presence of palladium) the mixture of fat acids derived from tall oil (composed of approximately 40–45% linoleic and 50–55% oleic, such percents being by weight). The addition of the dimer acid chloride took 15 minutes. Refluxing was continued for three hours by which time infrared analysis indicated conversion of acid chloride to be essentially complete. Solids were removed by filtration and then washed on the filter with n-heptane. The combined filtrates were shaken with two 25 ml. cold water rinses, dried over $MgSO_4$ and stripped to a constant weight on a rotary evaporator. There was obtained 12.4 g. dimeryl isocyanate (OCN—D—NCO) having a percent NCO of 14.3 (titration with di-n-butylamine), percent Cl (ionic) of 0.06 and percent diisocyanate of 96 (infrared).

EXAMPLE II

Example I was essentially repeated except that refluxing was carried out for 3½ hours after the addition of the dimer acid chloride after which the reaction mixture was cooled. It was then shaken with 100 ml. of a 50:50 by volume solution of acetonitrile and water. The phases were allowed to partition, the three lower phases (water, sludge, $CH_3CN$) were separated and the upper phase was washed once more with water. The washed upper phase was dried over $MgSO_4$, filtered and stripped to a constant weight on a rotary evaporator. There was obtained 8 g. dimeryl isocyanate (percent NCO—99% and percent diisocyanate 98%). This example illustrates the use of acetonitrile-water mixtures to produce very pure products.

EXAMPLE III

Example II was essentially repeated using the following reactants and solvents:

| | | |
|---|---|---|
| Dimer acid chloride | g. (0.3 eq.) | 93 |
| $NaN_3$ | g. (0.66 eq.) | 43 |
| N-methyl-2-pyrrolidone | ml | 6 |
| N-heptane | ml | 150 |

The dimer acid chloride was added over a 14 minute period and refluxing was continued for one hour at which point conversion of acid chloride was complete (infrared analysis). There was obtained 80.1 g. of dimeryl isocyanate (percent NCO—14.2, percent Cl—0.04, and percent diisocyanate—92). This example illustrates that the reaction is accelerated by using a larger excess of sodium azide.

EXAMPLE IV

Dimer acid chloride as used in Example I (615 g., 2 eq.) was dropped into a stirred slurry of 143 g. (2.2 eq.) sodium azide, 40 ml. N-methyl-2-pyrrolidone and 1000 ml. n-heptane at reflux. The addition took 32 minutes. After an initial vigorous reaction, the reaction rate decreased. After six hours, a small amount (4.3 g., 0.066 eq.) of sodium azide was added, but the addition did not cause much of an increase in gas evolution. Refluxing was continued for 30¼ hours, by which time only a very small acid chloride adsorption was noticeable by infrared analysis. The reaction mixture was cooled and then the heptane phase was separated, rinsed with ice water several times, dried over $MgSO_4$ and stripped to a constant weight on a rotary evaporator. There was obtained 530 g. dimeryl isocyanate (percent NCO—14.1, percent Cl—0.15 and percent diisocyanate—94.5%).

EXAMPLE V

Example I was essentially repeated using the following reactants and solvents:

| | | |
|---|---|---|
| Dimer acid chloride | g. (0.05 eq.) | 15.3 |
| $NaN_3$ | g. (0.055 eq.) | 3.58 |
| N-methyl-2-pyrrolidone | ml | 1 |
| 1,2-dichloroethane | ml | 25 |

The addition of dimer acid chloride took 10 minutes and the reaction mixture was refluxed for 4.5 hours. There was obtained 11.5 g. dimeryl isocyanate (percent NCO—14.0, percent Cl—0.07 and percent diisocyanate—98).

EXAMPLE VI

Palmitoyl chloride (27.5 g., 0.1 eq.) was added to a stirring, refluxing mixture of 7.15 g. (0.11 eq.) sodium azide, 2 ml. N-methyl-2-pyrrolidone and 50 ml. n-heptane over a 3½ minute period. The reaction proceeded vigorously at first and then slowed down being essentially complete in 2½ hours. The heptane product slurry was filtered and the solution was rinsed four times with 60 ml. portions of acetonitrile. The solution was then stripped to a constant weight on a rotary evaporator. There was obtained 21 g. n-pentadecyl isocyanate (percent NCO—15.2, percent Cl—0.09 and percent isocyanate—97).

The embodiments of the invention in which an exclusive property or privilege is claimed are defined as follows:

1. In the process of preparing organic isocyanates wherein an organic acyl halide is reacted with an alkali or alkaline earth metal azide to produce an organic acyl azide which is decomposed to the organic isocyanate, the improvement comprising carrying out the organic acyl azide formation reaction and the decomposition thereof in one step in the presence of N-methyl-2-pyrrolidone in an amount sufficient to accelerate the reaction.

2. The process of claim 1 wherein the N-methyl-2-pyrrolidone is used in an amount of about .25 to 25% by weight based on the organic acyl halide.

3. The process of claim 2 wherein the reaction mixture also includes an inert, essentially water-immiscible organic solvent.

4. The process of claim 3 wherein the metal azide is sodium azide and the same is used in an amount of from more than 1 to 3 times the equivalents of the organic acyl halide.

5. The process of claim 4 wherein the reaction is carried out at a temperature of about 70 to 150° C.

6. The process of claim 4 wherein the organic acyl halide is palmitoyl chloride.

7. The process of claim 4 wherein the organic acyl halide is difunctional.

8. The process of claim 7 wherein the organic acyl halide is a dimer acid chloride derived from dimerized fat acids prepared by polymerizing ethylenically unsaturated monocarboxylic acids of from 16 to 22 carbon atoms.

References Cited

UNITED STATES PATENTS 2,514,328   7/1950   Jones _____ 260—453 X

LEWIS GOTTS, Primary Examiner

D. H. TORRENCE, Assistant Examiner

U.S. Cl. X.R.

260—453 AR, 453 AL